Dec. 14, 1937.     J. A. KINNEY     2,102,417
APPARATUS FOR MANUFACTURING BOLTS AND SIMILAR ARTICLES
Filed April 12, 1935     9 Sheets-Sheet 3

Inventor
James A. Kinney.
By R. S. A. Dougherty
Attorney

Fig. 6.

Dec. 14, 1937. J. A. KINNEY 2,102,417
APPARATUS FOR MANUFACTURING BOLTS AND SIMILAR ARTICLES
Filed April 12, 1935  9 Sheets-Sheet 9

Inventor
James A. Kinney.
By R. S. A. Dougherty
Attorney

Patented Dec. 14, 1937

2,102,417

UNITED STATES PATENT OFFICE 2,102,417

APPARATUS FOR MANUFACTURING BOLTS AND SIMILAR ARTICLES

James A. Kinney, Lebanon, Pa., assignor to Bethlehem Steel Company, a corporation of Pennsylvania Application April 12, 1935, Serial No. 15,975

27 Claims. (Cl. 263—6)

My invention relates to certain new and useful improvements in apparatus for manufacturing bolts and similar articles and relates more especially to the apparatus and treatment of track-bolts during their formation.

Heretofore in manufacturing track-bolts of this type lengths of bars are heated to a forging temperature in a heating furnace and then fed by the use of tongs from the heating furnace to the feed rolls of a continuous header or forging machine located adjacent to the furnace. The forging machine shears off the bolt-blank lengths, heads them and drops them into a pan type conveyor.

The conveyor delivers the heated blanks to a chute that serves two hot roll threading machines, having an operator for each machine. Each operator procures a supply of heated blanks for his thread rolling machine by opening a trap in the chute operated by a foot treadle. The bolt-blanks are fed by hand to the roll threading machines, and the threads formed thereon, using the forging heat for the bar.

After the threading operation the bolts are allowed to cool and are subsequently delivered by hand to a heat treating furnace, where they are given one treatment which consists in heating the bolts to the critical temperature and finally quenching them in oil.

After the bolts have been formed heat treated and quenched in oil, they are assembled with nuts and prepared for shipment.

Considerable difficulty is encountered in maintaining proper thread fits by this method of manufacture, as the threads thus formed have varying pitch which necessitate fitting individual nuts to the bolts.

To maintain thread measurements within the tolerance limits of the American Standards Class II, fit is commercially impractical with this usual method of manufacture.

The proper fit between the nut and bolt is now obtained by tapping the nuts after the bolts have been threaded in order to match as nearly as possible the thread on the bolt. Even then at least three sizes of nuts threads are tapped for each run of bolts. The fit is then obtained by the assembler trying different nuts on each bolt until the proper fit has been found.

In extreme cases as many as five different sizes of nut tappings are required for one run or lot of bolts. This is objectionable to the customer and also entails extra expense.

A careful study was made to determine why the bolts finished in this condition. While there are several factors contributing to the variation of thread dimensions, the principal factor is the temperature variation.

In the first place it was found that there is a lack of uniformity of temperature throughout the length of a furnace for heating long bars of this type, and a uniform temperature cannot be maintained from end to end of the bar.

In the second place it was noted that when a new bar is taken from the furnace and fed to the machine the front end of the bar enters the dies of the machine at approximately the same as the furnace temperature, because the time in which it can cool off after leaving the furnace is very small. As the bar feeds into the forging machine progressively at the rate of about ninety blanks per minute, that portion that moves at this slow rate of speed through the gap between the furnace and forging machine cools down somewhat before it enters the dies.

In the third place, the pans of the conveyor between the forging and threading machines carry some water picked up from the cooling water for the dies of the forging machine.

This water and the sides of the pan conveyor have a chilling effect upon whichever part of the hot blank which happens to touch the same, as a bolt that lies horizontally in the conveyor pan will receive more cooling effect than one that stands head downward with the shank pointing upwardly on the inclined side of the conveyor, with the result that some of the banks may have hard spots detrimental to the threading operation, and cause unequal cooling and thereby unequal pitch of the threads.

Effort is made to get rid of this water in the pans by perforations, but scale and dirt has a clogging effect so that all the water does not drain off.

In the fourth place in the hand process of feeding bolt-blanks to the roll threaders, the blanks are not picked out of the chute in the same sequence in which the heads are forged and therefore some of them lie in the chute until they have cooled off considerably before the thread rolling operation.

Due to this difference in the temperatures of the blanks, some of the threads were rolled while at a good working heat while others were threaded at a lower temperature which caused the blank to stiffen up and produce variable pitch threads.

In the fifth place, it is necessary to use two thread rolling machines to keep up with one forging machine when the heading and threading operations are done in the same heat. Here again is an opportunity for inequalities to occur in the pitch of the threads, because of slight differences in the set-up of the threading dies in the different machines, and also slight differences in the dies themselves. When one of the threading machines is out of production for any cause the forging machine continues to operate, feeding as many blanks to the remaining threader as it will take. The surplus is allowed to get cold and must be re-heated and threaded in a third machine, introducing another die-set-up to add to possibilities of inaccuracy and the additional cost of reheating.

In the sixth place, the heat treatment following the threading operation causes a scale formation on the thread of varying thickness and non-uniformity. Here again is opportunity for unequal expansion and contraction which may effect the pitch of the thread. All of which defects will be eliminated by my improved method.

I have found by actual experiment that a variation as much as .023 of an inch will occur in the pitch of the thread of a bolt one inch in diameter between the extremes of normal rolling temperatures, and that this variation of the pitch of the thread can be held to about .008 of an inch when the thread is rolled at uniform temperatures.

In view of this investigation it was decided if all of these errors, singly or combined were corrected, then threads could be produced on the bolt having uniform pitch and depth, which would eliminate the objections of the railroads and cut down the manufacturing costs of having to tap an assortment, of from three to five nuts having differences in pitch so as to match the differences in pitch of the threads on the various bolts, and having to select a nut to fit a particular bolt. This is a slow and time consuming operation because it must be done by hand.

By my method all of the objectional features tending to produce irregularity in thread characteristics are obviated with the result that bolts having uniform threads can be produced which require the tapping of but one size of nuts, thereby the screwing of the nut on the bolt is a simple and speedy operation and a big time saver over the usual method now in use.

In my invention a heated bar is taken from the furnace and fed into the heading or forging machine which cuts the bar into bolt lengths, and then upsets a head on the end of each length in the usual manner. The forged blanks are then picked up by the conveyor and deposited in collecting boxes to cool.

After the blanks have cooled sufficiently to allow handling they are fed manually into a heat treating furnace which advances them in rows in a step-by-step movement through the furnace and heats them to at least the critical point or a little above the same which will usually be between 1475° F. to 1525° F., which may vary somewhat depending on the carbon content of the steel used as the higher the carbon content the lower the temperature required to raise the steel to the critical point. The time consumed for passing the blanks through the furnace is sufficient to bring the bolt-blanks up to this heat, after which they are automatically ejected one at a time from alternate rows and immediately fed into a single thread rolling machine, from which the threaded bolts drop into an oil quenching tank and from which they are removed by an endless conveyor and collected in boxes. The nuts are then screwed on to the bolts to complete the operation for the assembled article.

By this method, it does not matter whether the bolts are all headed from a bar having a hot and cold end because the threading does not follow the head forging operation and in the same heat. The threading operation follows the heating for treatment, whereby each separate blank is heated to the same degree of temperature as it is fed to the threading machine. The step of threading the bolt-blanks all at the same temperature after heating for treatment is very important because here the thread is produced practically at the end instead of in the middle of the operation. Threading at this point also presents another distinct advantage, in that threading after the final heating removes all the scale on the threaded portion produced by heating before it enters the quenching tank with the result that the finished thread emerges from the tank free from scale and bright and clean.

The water picked up by the conveyor from the forging machine will have no ill effect upon the blanks to be threaded because the blanks are again heated to a uniform temperature before threading, thereby eliminating the unequal cooling effect of the water which affected the pitch of the threads when forging and threading in one heat.

One of the objects of my invention relates to the construction of the heat treating furnace in which a plurality of sets of reciprocating pusher bars advance the bolt-blanks in a step-by-step movement through the furnace from the front or charging end and automatically eject them from the opposite end of the furnace.

Another object of my invention relates to the manner of supporting the rows of bolt-blanks by their heads and lower ends of the shanks to allow the heat in the furnace to circulate around the shanks of the bolt-blanks at all times during their travel through the furnace.

Another object of my invention relates to the manner of adjusting and reciprocating the sets of pusher-bars in the heat treating furnace so they will eject the bolt-blanks from the furnace in sequence and in fixed timed relation to each other.

Another object of my invention has reference to the means for automatically discharging the bolt-blanks from the heat treating furnace.

Other objects of my invention will hereinafter appear.

Having thus given a general description of my invention, I will now in order to make the same more clear, refer to the annexed nine sheets of drawings forming a part of this specification and in which like characters of reference denote like parts.

Figure 2 is a diagrammatic view illustrating the different steps used in my improved or new method of forming and heat treating track-bolts or the like.

Figure 1:
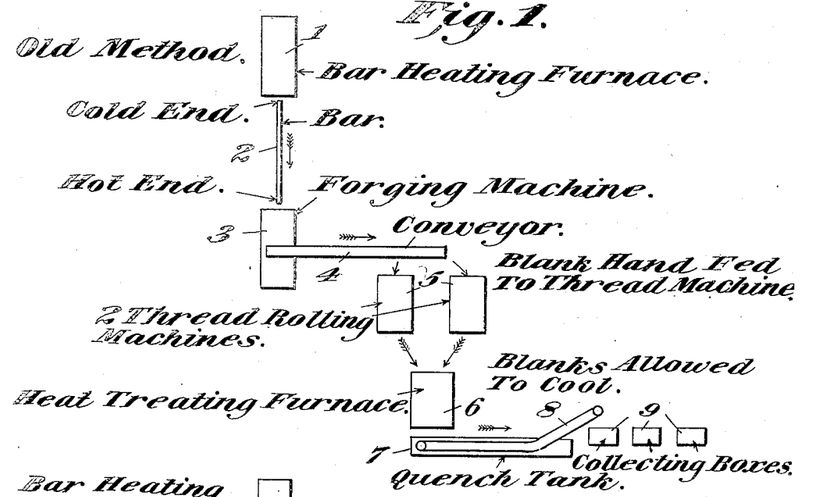
Figure 1 is a diagrammatic view illustrating the different steps used in the old or usual method of forming and heat treating track-bolts.

Referring now to the various characters of reference on the drawings:

In Fig. 1 which illustrates diagrammatically the steps used in the old or usual method of forming track-bolts, a heating furnace is indicated as 1, in which the bars 2 are heated and advanced to the forging machine 3, which shears the bars 2 into bolt-blank lengths and upsets a head on one end of each of the blanks and deposits them on the conveyor 4. The conveyor delivers the heated blanks to a chute (not shown) from which two operators receive the bolt-blanks and feed them manually to the two thread rolling machines 5, after which the bolt-blanks are allowed to cool. The bolt-blanks are then fed manually to a heat treating furnace 6, where they are heated to a critical temperature and then quenched in a tank 7, from which they are removed by means of an endless conveyor 8, and collected in boxes 9.

Figure 2:
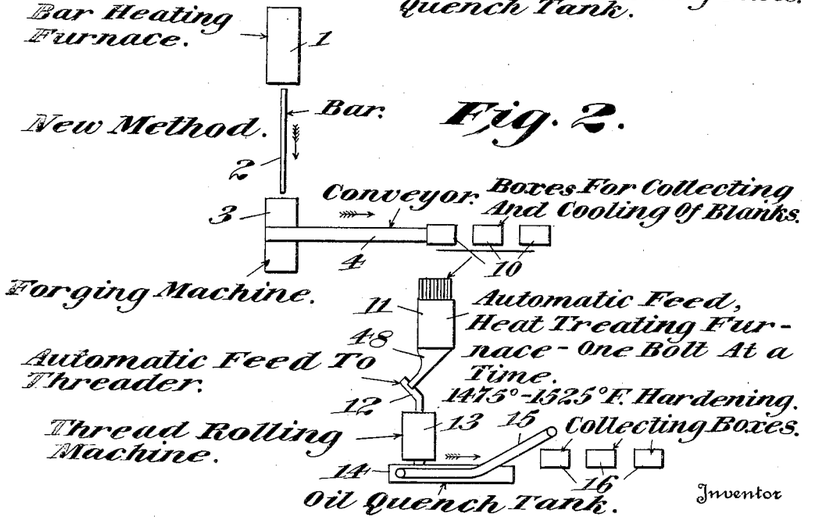
Figure 3:
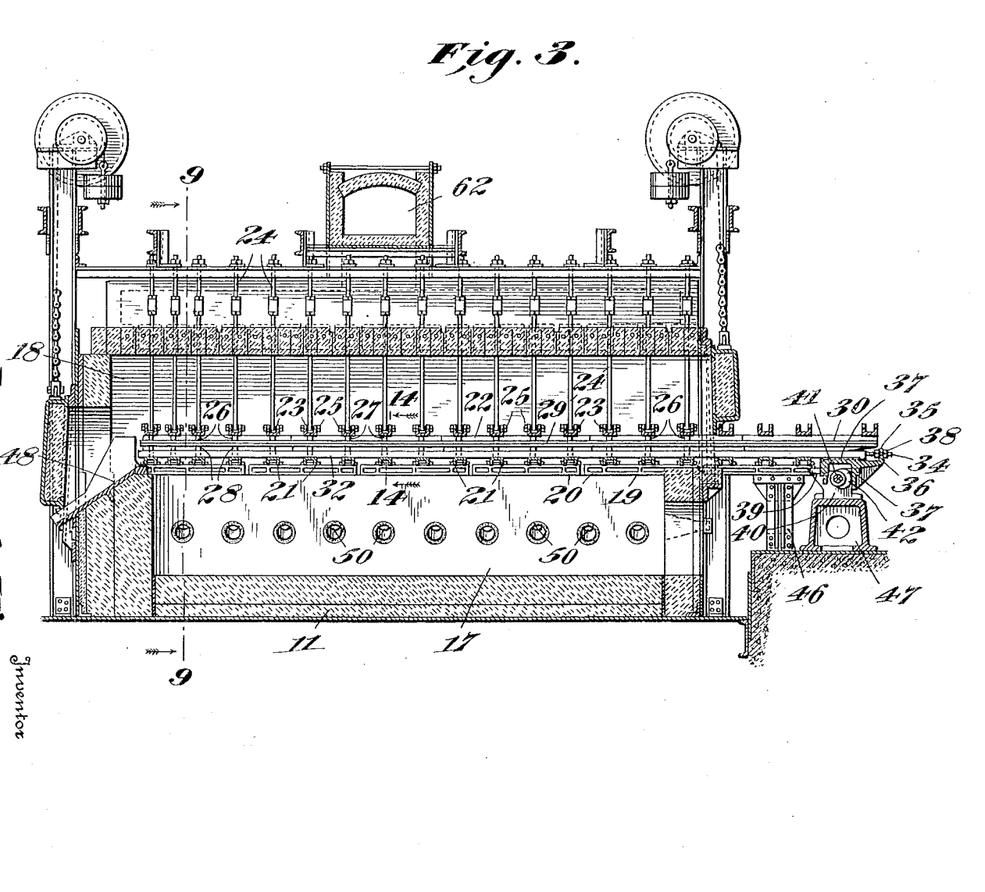
Fig. 3 is a vertical longitudinal section through the center of the heat treating furnace, showing the pusher-bar in the extreme forward position.
Figure 4:
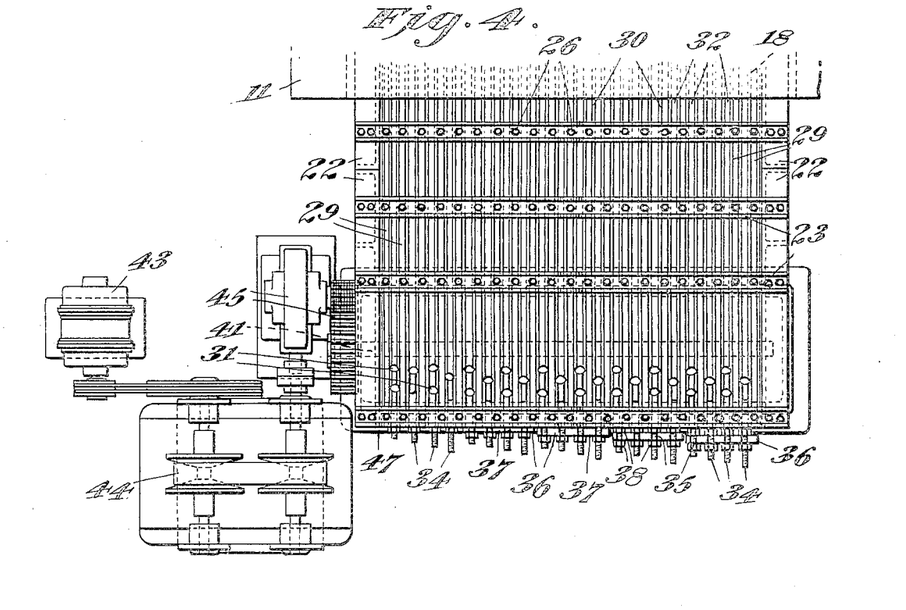
Fig. 4 is a top plan view of the charging end portion of the heat treating furnace.
Figure 5:
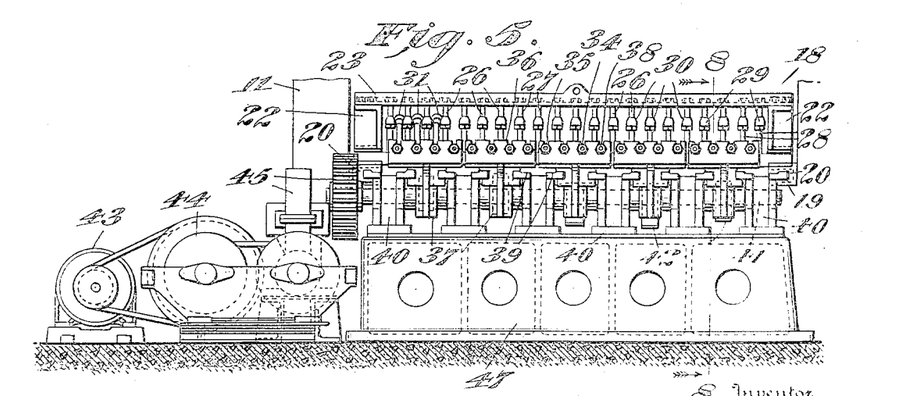
Fig. 5 is an elevation of the charging end of the furnace as shown in Fig. 4.
Figure 6:
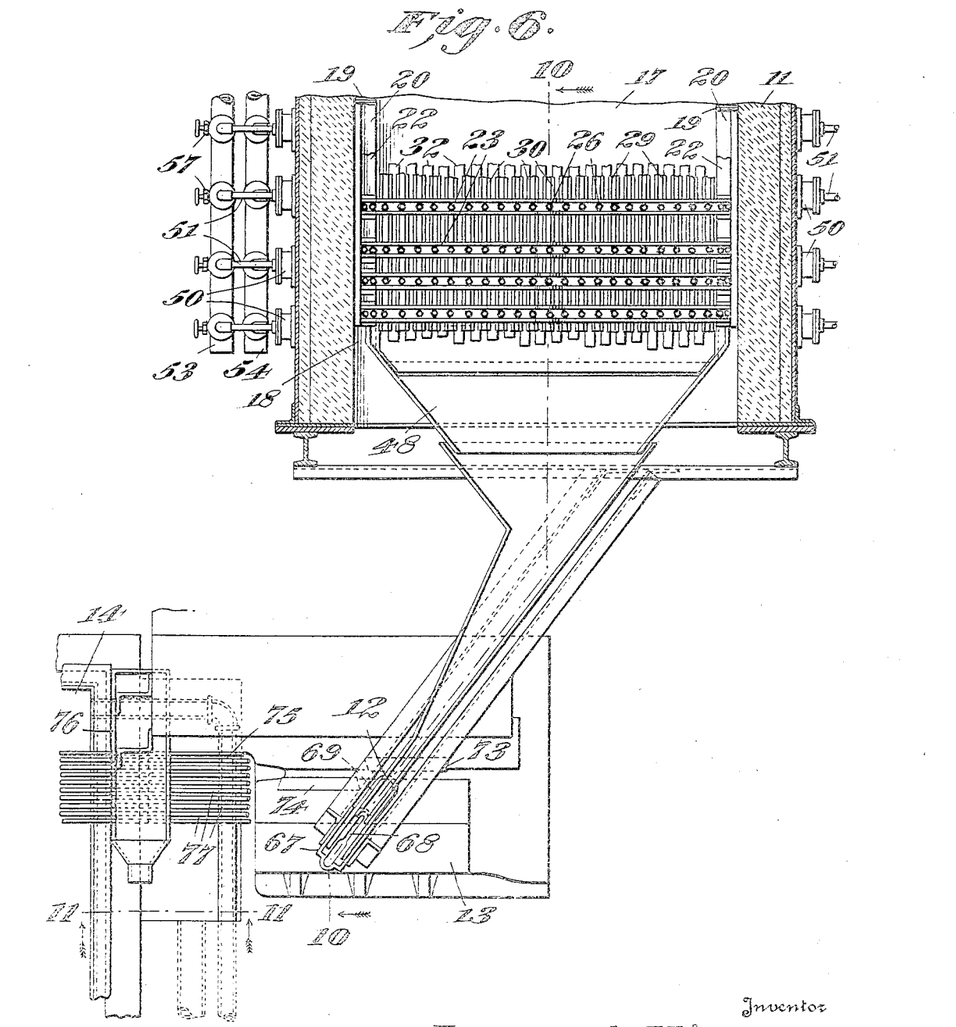
Fig. 6 is a plan of the ejecting or rear end of the furnace illustrating its relative position in relation to the thread rolling machine and the quenching tank, the end side walls of the furnace being shown in section.
Figure 7:
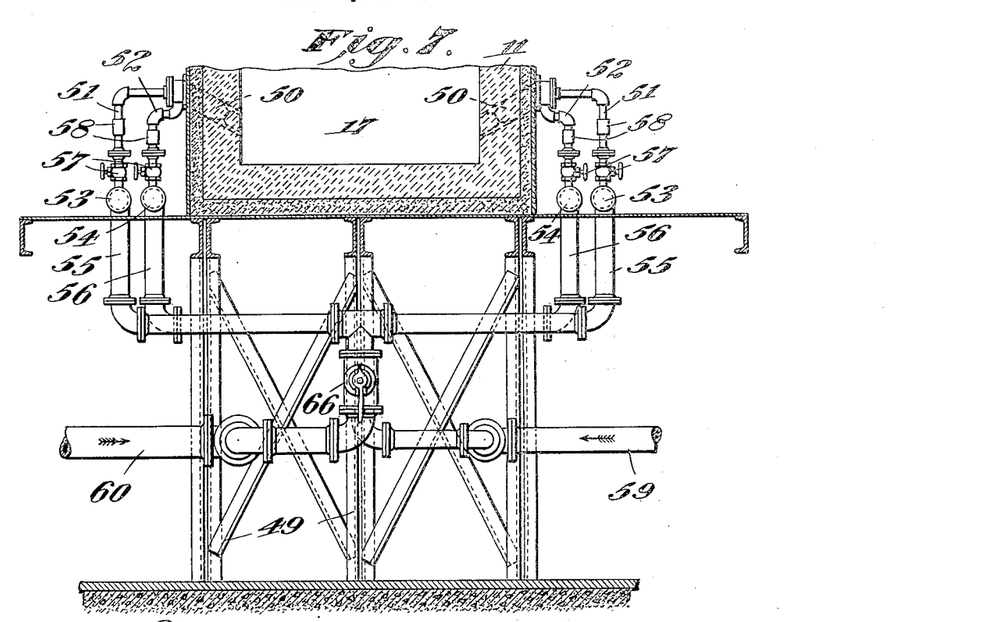
Fig. 7 is a vertical transverse section through the lower portion of the heat treating furnace taken on the line 7—7 of Fig. 12 and showing the air and gas pipe connections for the burners.

In Fig. 2, I have illustrated diagrammatically the steps used in my improved or new method of forming track-bolts, or the like in which the bolt-blank forming operation is the same as in the old or usual method, having the same bar heating furnace 1 for heating the bar 2, forging machine 3, and conveyor 4, which transfers them to the collecting boxes 10, to cool. After the bolt-blanks have cooled sufficiently to be handled, an operator feeds them manually to a heat treating furnace 11, having means for automatically advancing the bolt blanks in a step-by-step movement through the furnace, during which time the bolt-blanks are heated to at least the critical temperature and then ejected into an automatic feed 12, to a single roll threading machine 13, from which they are ejected into the tank 14, and quenched in oil and later removed by means of an endless conveyor 15, and collected in boxes 16, ready to have the nuts assembled thereon before shipment.

The heat treating furnace 11, is provided with a combustion chamber 17, and a heating chamber 18, having doors at each end which are normally closed. The combustion chamber 17, is slightly narrower than the heating chamber 18, the opposite side walls each being formed with a ledge at their upper edges as at 19, to receive side-rails 20, for supporting the ends of a plurality of spaced bottom cross-sills 21. Side-beams 22, are mounted on the ends of the bottom cross-sills 21, adapted to support the ends of top cross-sill 23, the central portions of said top cross-sills 23, being supported by means of hangers 24, pivoted thereto as at 25, with their upper ends attached to the frame work above the furnace structure. The bottom and top cross-sills 21 and 23, are connected together by means of a plurality of vertically extending equally spaced bolts 26, each having a shoulder or elongated intermediate portion 27, and a pipe separator mounted thereon as at 28, between which is mounted and clamped the longitudinally extending guide-bars 29, having beveled side edges 30, adapted to engage and support the heads of the track bolt-blanks 31, during their transit through the heating furnace. These bolts 26, have their top and bottom ends threaded and inserted through holes in the webs of the top and bottom cross-sills, and nuts applied thereto, the ends of the bolts 26 being riveted after the nuts have been applied.

The bolts 26, connecting each pair of bottom and top cross-sills 21 and 23, with the pipe separators 28, mounted thereon are each in longitudinal alignment with the bolts 26, and separators 28, connecting the adjacent pairs of cross-sills throughout the length of the furnace.

Slidably mounted on top of the bottom cross-sills 23, between the separators 28, below each pair of guide-bars 29, and in staggered relation therewith is a pusher-bar 32, each having a plurality of sockets 33 formed therein on its upper surface to receive the points or lower ends of the shanks of the bolt-blanks 31.

As the bolt-blanks 31 are charged into the furnace in an inclined position several different lengths and sizes can be treated without changing the feed mechanism.

The outer ends of the pusher-bars 32 extend some distance beyond the front end of the furnace and are formed with cylindrical portions threaded as at 34, and adapted to extend through notches 35, in the upwardly extending flanges 36, of the yokes 37, and adjustably secured thereto by means of nuts 38, on each side of the flanges 36.

In the heat treating furnace 11 illustrated, five yokes are shown each having four pusher-bars 32 attached thereto and adapted to slide on ways 39, on the top of journal bearings 40, for the cam-shaft 41, having cams mounted thereon as at 42, each adapted to engage a yoke. But this number of pusher-bars 32, and yokes 37, may be varied without departing from the spirit of my invention.

The cam-shaft 41, is driven by a motor 43, through a variable drive of the "Reeves" type 44, and reduction gearing 45.

Figure 16:
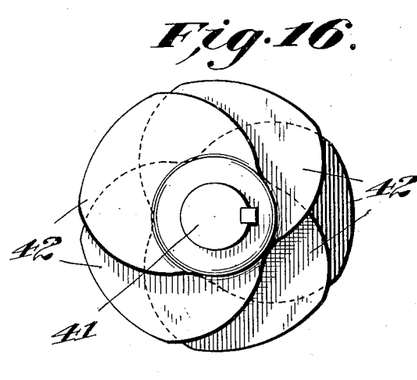
Fig. 16 is a detail end elevation of the cam-shaft detached illustrating the relative positions of the cams mounted thereon which engage the yokes that actuate the sets of pusher-bars.
Figure 17:
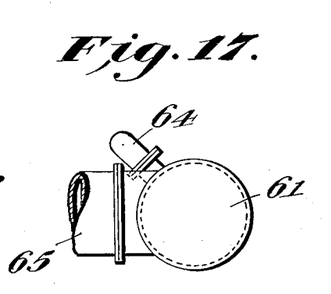
Fig. 17 is a detail of the top end of the recuperators showing the blower and stack connections thereto.

The cams 42, are adapted to engage the inner surfaces of the yokes in sequence and to accomplish this are keyed to the cam-shaft 41, with the central portions of the cam surfaces spaced apart each fifth of the circumference of the shaft as indicated in Fig. 16 which with the adjustments of the pusher-bars will allow the bolt-blanks to be ejected one at a time from the rear end of the furnace.

As indicated in Figs. 3, 4, 5 and 8 of the drawings, the guide-bars 29, and pusher-bars 32 with their supporting mechanism extend some distance outwardly from the front or charging end of the furnace. The side-rails 20, being supported by standards 46, and the journal bearings 40, by a base plate casting 47.

Figure 8:
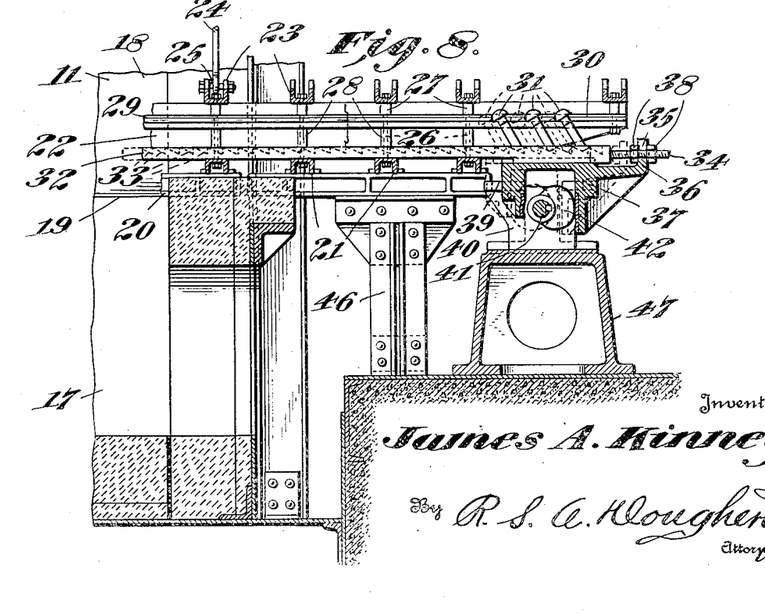
Fig. 8 is a detail longitudinal section taken on the line 8—8 of Fig. 5 but drawn on a larger scale, illustrating the manner of advancing the bolt-blanks in a step-by-step movement through the heat treating furnace.
Figure 9:
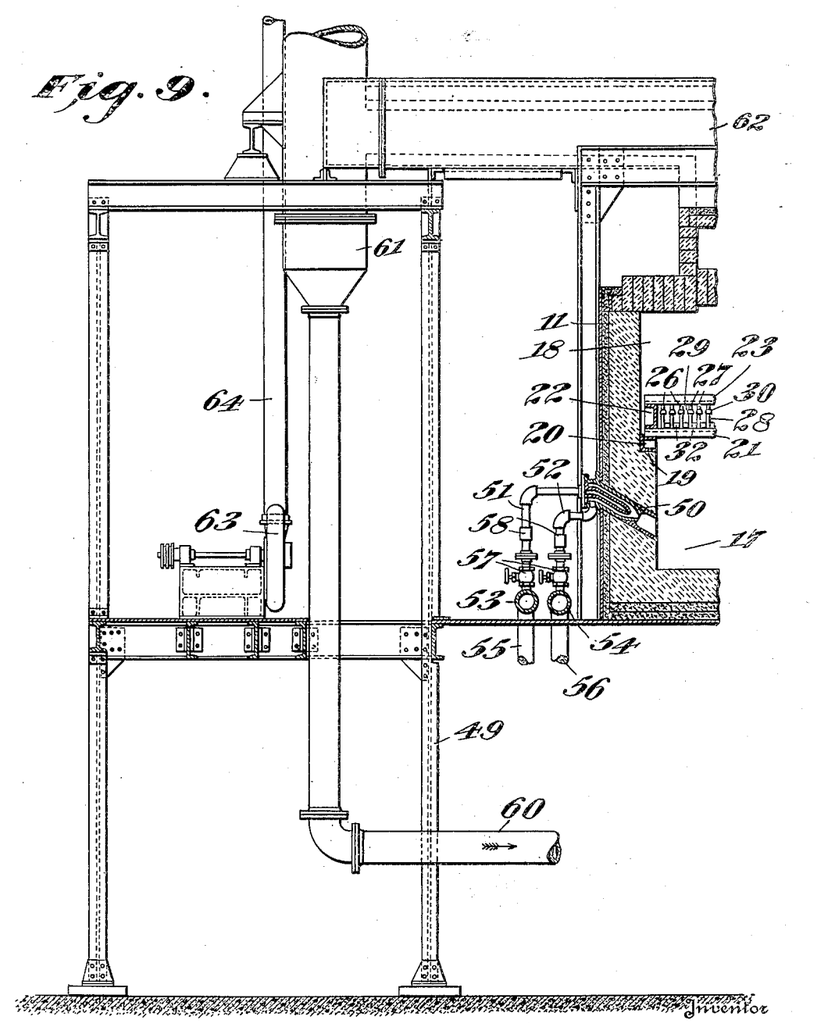
Fig. 9 is a detail section through one side of the heat treating furnace taken on the line 9—9 of Fig. 3.
Figures 10, 11:
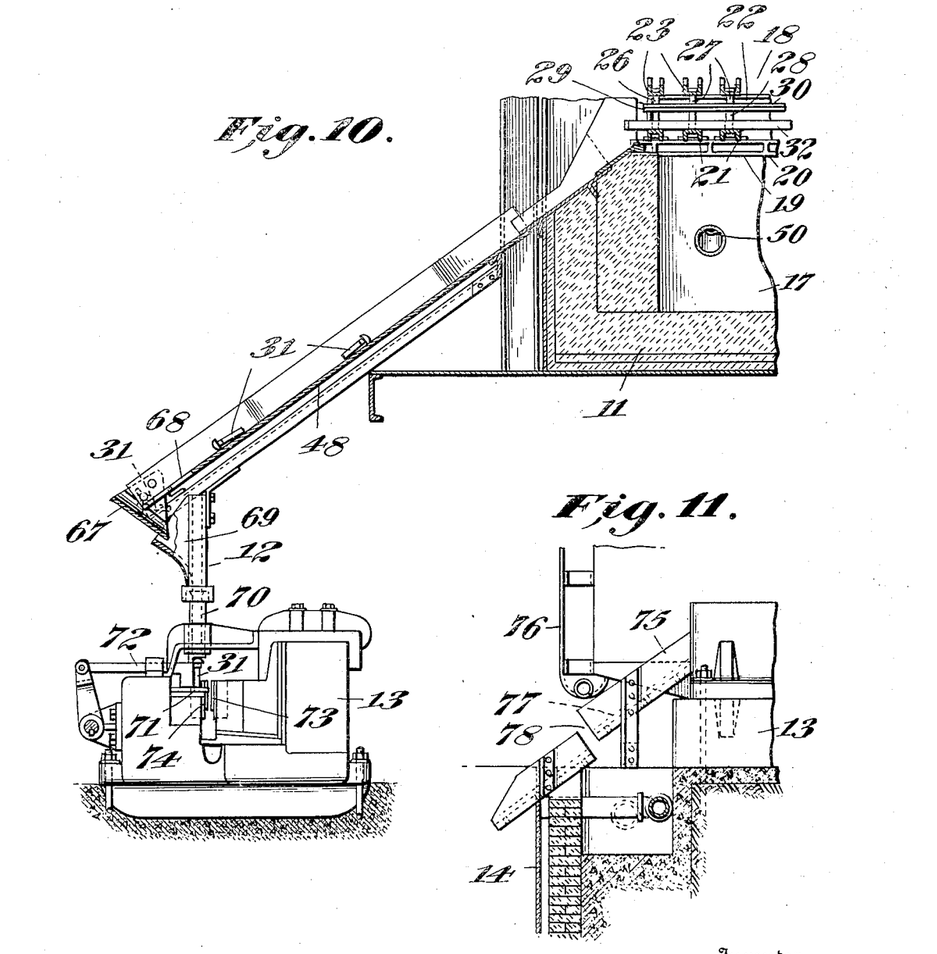
Fig. 10 is a vertical longitudinal section through the ejecting end of the furnace and chute mechanism taken on the line 10—10 of Fig. 6.
Fig. 11 is a detail section taken on the line 11—11 of Fig. 6.
Figure 12:
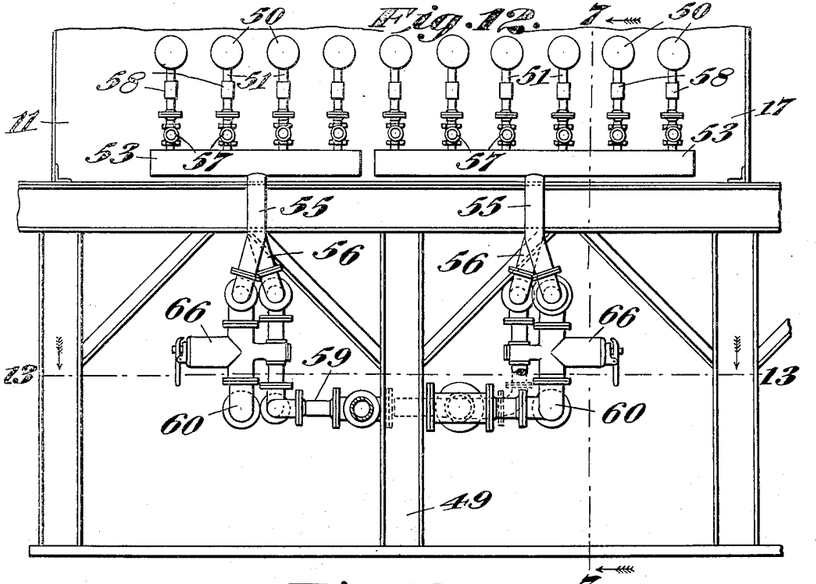
Fig. 12 is a side elevation of the lower portion of the heat treating furnace and showing the arrangement of the burners and the pipe connections thereto.
Figure 13:
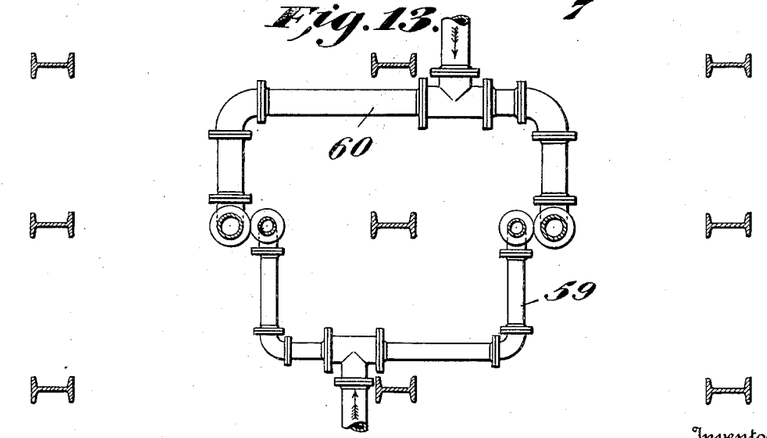
Fig. 13 is a detail section taken on the line 13—13 of Fig. 12, showing in plan the arrangement of a portion of the piping for the burners on one side of the furnace.
Figure 14:
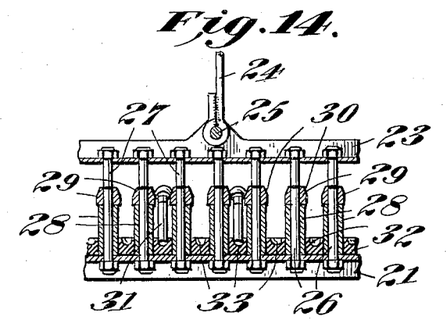
Fig. 14 is a detail section taken on the line 14—14 of Fig. 3 showing an enlarged detail illustrating the manner of supporting and mounting the pusher-bars and the adjacent parts thereto.
Figure 15:
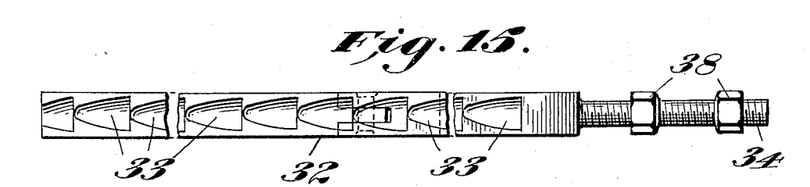
Fig. 15 shows an enlarged top plan view of a portion of one of the pusher-bars.

The bolt-blanks 31 are fed by hand into the charging end of the furnace, the lower end of each shank being seated in a socket 33, of the pusher-bars 32, with the head held between the beveled sides 30 of the guide-bars 29, assuming an inclined position as indicated in full lines in Fig. 8. As the pusher-bars 32 are reciprocated the heads of the bolt-blanks have a tendency to be raised slightly, when they are pushed forward on the rearward stroke, but on account of their weight will continue to contact with the guide-bars and at the end of the stroke the lower end of each blank will be advanced to the next socket, as indicated in dotted lines in this figure. On the forward stroke of the pusher-bars 32, the bolt-blanks will be held by their heads between the beveled sides 30, of the guide-bars 29, and the lower ends of the shanks of the bolt-blanks will slide over the pusher-bars into the next sockets. In this manner the bolt-blanks are each advanced rearwardly a distance equal to the length of two sockets for each revolution of the cam-shaft. This operation is continued, the bolt-blanks being advanced progressively in a step-by-step movement from the front or charging end, until they reach the rear end of the furnace where they are automatically discharged into the chute 48.

The heat treating furnace is mounted some distance above the floor line on a superstructure 49, to allow free access to the air and gas pipe line and connections for the burners, which are situated on each side of the combustion chamber 17.

As illustrated the furnace is heated by means of ten burners 50 on each side thereof, having nozzles extending through openings in the side walls of the combustion chamber. The first six burners on each side of the furnace are connected by means of branch pipes 51 and 52 to manifolds 53 and 54, each having air and gas pipe connections 55 and 56 respectively. Each of the branch pipes 51 and 52 has a valve 57 for individually controlling the supply of air or gas to the burners, and as indicated may have a check-valve 58 to prevent any back pressure thereto. These six burners on each side of the furnace produce the initial heat therefor, while the final heat which may be of greater intensity is produced by four additional burners on each side of the furnace, and as they are constructed, connected and controlled in the same manner as the first six, but as separate units to more efficiently adjust the heat in the furnace, the same reference numerals will apply thereto.

The gas pipe connections 56 receive their supply of gas from any suitable source, through the gas mains 59, while the air is received through the air main 60. The air is first heated by passing through a recuperator 61, the recuperator being heated by the off-gases from the top of the furnace which pass out therefrom through the conduit 62.

In order to create a forced draft or pressure for the air, a fan blower 63, is used having a pipe connection 64, extending to the intermediate portion of the recuperator 61, the upper end of the recuperator having a flue connection 65, extending to a chimney or stack.

The supply of air and gas to the pipe connections 55 and 56 are further controlled by means of the main supply valves 66.

After the bolt-blanks 31 have passed through the heat treating furnace 11 and ejected into the chute 48, they slide down the inclined way until they engage an adjustable stop 67, at the lower end of the chute where they are deflected, the shank of the bolt passing through the slot 68, at the end of the chute. The upper portion of this slot 68, is just wide enough to permit the shank of the bolt-blank to pass through but not wide enough for the passage of the head, the slot being long enough to allow the shank to pass through first whether the head or shank end of the bolt-blank is pointing downwardly.

The lower end of the slot 68 is made somewhat wider than the upper portion to allow the head of the blank to pass through. If the bolt-blank is sliding head first down the inclined surface of the chute 48 it will pass into the wider portion of the slot and guide the shank into the narrower portion, the momentum of the blank being great enough to allow it to strike the stop 67 and swing the shank downwardly.

The stop 67 deflects the bolt-blank into the funnel 69, where it drops into the cup 70, with its lower end engaging the depth gage 71, mounted on the roll threading machine 13, from which point it is advanced into position for the roll threading operation by means of the pusher-bar 72, of a feeding mechanism which is connected and operated in timed relation with the reciprocating thread rolling die 73.

The thread rolling machine is shown diagrammatically as it will be understood that this machine is of a well known standard construction.

After the bolt-blank has been advanced by the pusher-bar 72 into the thread rolling position, the movable die 73, is reciprocated and the bolt-blank threaded by rolling it between the faces of the movable and fixed die 74. At the end of the reciprocating stroke of the movable die the threaded bolt is ejected into a chute 75, and thence into the oil quenching tank 14, from which it is removed by the endless conveyor 15.

As the roll threading dies are cooled by water flowing on them, a shield 76, is secured to the end of the machine adjacent to the oil quenching tank 14, to prevent water from being precipitated into the oil quenching tank during the reciprocation of the movable die, and as the threaded bolt when it is ejected from the threading machine retains some water, the floor 77, of the chute 75, is made of spaced bars, the chute being divided as at 78 to allow the water to drain off the threaded bolts as much as possible before it slides into the oil quenching bath.

Because of the long time intervals required and the cooling effect of the water used on the dies for forging and roll threading in one heat necessitates that the initial heat of the bar must be 200° to 400° F. higher than the critical range. Therefore the bolt has to be quenched after it has cooled back to the critical range. This does not produce good physical properties, as the grain in this case is very much larger than when the bolt has been brought up to the critical temperature and then quenched without first having been heated several hundred degrees beyond this point and allowed to cool back. By a series of tests I have found that you cannot heat a track-bolt several hundred degrees above the critical temperature, allow it to cool back to that range, then quench, and expect to meet the physical properties that are specified in track-bolt work.

In my method of forming the bolt-blanks in one operation and heat treating, threading the blanks in one machine, and quenching them in a separate independent final operation is of great advantage as it enables me to thread the blanks and quench them all at a working temperature at approximately the critical point thereby maintaining the pitch of the thread. As the forging and roll threading machines are no longer connected together as a unit, neither will lose production because of delays in the other.

My continuous feed heat treating furnace is of sufficient capacity to heat bolts at a rate equal to the capacity of one thread rolling machine. This is approximately forty bolts per minute. All bolts are fed at a uniform rate and all presented shank first to the automatic feed for the thread rolling machine. A rate of heating forty bolts per minute requires that at least 1200 bolt-blanks be in the furnace heating at all times, this will allow about thirty minutes for each blank to heat in its transit through the furnace. This number and the time required may be varied and is only given as an example. To have this many blanks in the furnace at one time without excessive furnace size, to be able to feed them one at a time at a regular rate of forty blanks per minute without jambing or without delivering more than one on any stroke of the furnace mechanism, to present them all shank first on delivery to the thread rolling machine, and to have a system of handling within the furnace that would lend itself to changes of bolt diameters and length without extensive adjustments to the mechanism are features that are necessary for the successful operation of this method.

The threading machine will operate several strokes per minute faster than the number of blanks discharged from the furnace for the reasons that in case two blanks happen to be ejected into the chute 48 at about the same time the threading machine and the feeding device therefor will be able to take care of this irregularity, or in the event of a stroke of the roller feed jambing the blank missed will be quickly picked up again so that there will be no accumulation of bolt-blanks between the furnace and the threading machine.

Although I have shown and described my improvements in considerable detail, I do not wish to be limited to the exact and specific details shown and described, but may use such substitutions, modifications or equivalents thereof, as are embraced within the scope of my invention, or as pointed out in the claims.

Having thus described my invention what I claim as new and desire to secure by Letters Patent is:

1. A furnace of the class described, comprising a combustion chamber and a heating chamber, a plurality of pusher-bars in the heating chamber adapted to receive one end of articles to be heat treated, having their inner ends arranged in stepped relation to each other, stationary guide-bars arranged in pairs above each pusher-bar for supporting the opposite ends of the articles suspended in a vertically inclined position, and means for reciprocating the pusher-bars to advance the articles being heat treated through the heating chamber.

2. A furnace of the class described for heat treating articles, stationary guide-bars extending longitudinally in the furnace for supporting and guiding one end of rows of articles to be heat treated, pusher-bars mounted below the stationary guide-bars having their inner ends arranged in stepped relation to each other and in staggered relation with each pair of stationary guide-bars for supporting the opposite ends of the rows of articles, and means for reciprocating the pusher-bars.

3. A furnace of the class described for heat treating articles, a pair of guide-bars extending longitudinally of the furnace for supporting one end of the articles to be heat treated in a vertically inclined position to allow the heat to circulate around the articles, a pusher-bar between each pair of guide-bars and below the same in spaced relation therewith for supporting the other end of the articles, means for adjusting the pusher-bars in relation to each other and means for reciprocating the pusher-bar to advance the articles in the furnace.

4. A furnace of the class described for heat treating articles, a plurality of pairs of guide-bars extending longitudinally substantially the full length of the furnace, said guide-bars extending beyond one end of the furnace and adapted to receive and support one end of the articles charged into the furnace to be heat treated in vertically inclined position to allow the heat to circulate around the articles, a pusher-bar below and in parallel alignment and in spaced relation between each pair of guide-bars for supporting the opposite ends of the articles, and means for reciprocating the pusher-bars to advance the articles on the guide-bars and discharge them from the opposite end of the furnace.

5. A furnace of the class described adapted for heat treating articles, independent means for supporting the top and bottom ends of the articles in a vertical inclined position, and means actuated intermittently for reciprocating the bottom supporting means adapted to advance the articles in the furnace with each backward stroke.

6. A furnace of the class described adapted for heat treating articles, comprising a combustion chamber and a heating chamber, stationary guide-bars for supporting one end of the articles to be heat treated, a plurality of independently operated sets of pusher-bars for supporting the opposite ends of the articles, and a yoke for connecting each set of pusher-bars together and means for reciprocating each set of pusher-bars in timed relation to each other.

7. A furnace of the class described for heat treating articles, comprising a combustion chamber and a heating chamber, stationary guide-bars in the heating chamber for supporting one end of the articles to be heat treated, a plurality of sets of pusher-bars, each of said sets having their discharge ends arranged in stepped relation to each other for supporting the opposite ends of the articles, a yoke attached to each set of pusher-bars, a cam for intermittently engaging each yoke for simultaneously reciprocating the pusher-bars of each set, and means for rotating the cams to reciprocate the pusher-bars.

8. A furnace of the class described for heat treating articles, comprising a combustion chamber and a heating chamber, a plurality of fixed guide-bars for supporting one end of the articles to be heat treated suspended in a vertically inclined position, a plurality of sets of pusher-bars having their inner ends arranged in stepped relation to each other below the fixed guide-bars for supporting the opposite ends of the articles, a yoke attached to each set of pusher-bars and means for intermittently engaging the yokes in timed relation to reciprocate the pusher-bars.

9. A furnace of the class described for heat treating articles, comprising a combustion chamber and a heating chamber, a ledge at the top of each side of the combustion chamber, side-rails on the ledges, bottom cross-sills supported by the side-rails, side-beams secured to the ends of the bottom cross-sills, top sills having their ends supported by the side-beams, means for securing the top and bottom cross-sills together, stationary guides between the top and bottom sills for supporting one end of the articles to be heat treated, pusher-bars mounted on the bottom cross-sills for supporting the opposite ends of the articles, and means for reciprocating the pusher-bars to advance the articles through the furnace.

10. A furnace of the class described for heat treating bolts, stationary guide-bars having beveled side faces for engaging and supporting the heads of the bolts, and pusher-bars for supporting the opposite ends of the bolts, and means for reciprocating the pusher-bars for advancing the bolts through the furnace.

11. A furnace of the class described for heat treating bolts, stationary-guides extending longitudinally of the furnace for supporting the heads of the bolt-blanks with their shanks extending downwardly in an inclined position, pusher-bars mounted below the stationary-guides having sockets for receiving and supporting the opposite ends of the bolt-blanks, and means intermittently actuated for reciprocating the pusher-bars for advancing the bolt-blanks through the furnace.

12. A furnace of the class described for heat treating bolt-blanks, stationary-guide-bars having beveled sides extending longitudinally of the furnace for supporting one end of the bolt-blanks, pusher-bars in spaced relation with the guide-bars, sockets formed in the pusher-bars for receiving and supporting the opposite ends of the bolt-blanks, and means for reciprocating a plurality of the pusher-bars in opposite direction to each other to advance the bolt-blanks through the furnace.

13. A furnace of the class described for heat treating bolt-blanks, stationary guide-bars for supporting the heads of the bolt-blanks, pusher-bars arranged in sets each set comprising a plurality of pusher-bars connected together, and adapted to be reciprocated simultaneously, sockets formed in the pusher-bars for receiving the lower ends of the bolt-blanks, a yoke connecting each set of pusher-bars together and means for intermittently engaging the yokes to reciprocate the sets of pusher-bars in timed relation to each other and to advance the bolt-blanks in a step-by-step movement through the furnace.

14. A furnace of the class described for heat treating bolt-blanks or the like having a combustion chamber and a heating chamber, cross-sills between the combustion chamber and the heating chamber, stationary guide-bars secured to cross-sills for supporting the heads of the bolt-blanks, pusher-bars arranged in sets having sockets formed therein for receiving the lower ends of the bolt-blanks and means for reciprocating the sets of pusher bars in timed relation to each other to advance the bolt-blanks through the furnace.

15. A furnace of the class described for heat treating bolt-blanks or the like, comprising a combustion chamber and a heating chamber, a plurality of pairs of spaced cross-sills between the combustion chamber and the heating chamber, means for connecting each pair of cross-sills together, guide-bars extending longitudinally of the heating furnace between the cross-sills for supporting the heads of the bolt-blanks, a pusher-bar between the guide-bars for supporting the shank ends of the bolt-blanks, and means for simultaneously reciprocating the pusher-bars in timed relation to advance the bolt-blanks through the furnace.

16. A furnace of the class described for heat treating bolt-blanks, comprising a combustion chamber and a heating chamber, a plurality of pairs of cross-sills extending transversely of the furnace, bolts for connecting each pair of cross-sills together, guide-bars mounted on the bolts for supporting the heads of the bolt-blanks, a pusher-bar between the guide-bars, sockets in the pusher-bars adapted to receive the shank ends of the bolt-blanks, and means for reciprocating the pusher-bars adapted to advance the bolt-blanks in a step-by-step movement through the furnace.

17. A furnace of the class described for heat treating bolt-blanks, comprising a combustion chamber and a heating chamber, a plurality of pairs of spaced cross-sills extending transversely of the heating chamber, bolts having elongated portions for connecting each pair of cross-sills together, a pipe separator on each bolt, longitudinally extending stationary guide-bars mounted on the bolts between the elongated portion and the pipe separators having beveled sides for engaging and supporting the heads of the bolt-blanks, a pusher-bar between the guide-bars, sockets in the pusher-bars adapted to receive the shank ends of the bolt-blanks, and means for reciprocating the pusher-bars to advance the bolt-blanks in a step-by-step movement through the furnace.

18. A furnace of the class described for heat treating bolt-blanks or the like, comprising a combustion chamber and a heating chamber, stationary guide-bars extending longitudinally of the heating chamber for supporting the heads of the bolt-blanks, a pusher-bar below and in staggered relation with the stationary guide-bars, yokes each having a plurality of pusher-bars attached thereto having their inner ends arranged in stepped relation to each other, a cam for intermittently engaging each yoke in timed relation to each other, and means for rotating the cams to reciprocate the pusher-bars to advance the bolt-blank through the furnace.

19. A furnace of the class described for heat treating articles, comprising a combustion chamber and a heating chamber, a plurality of pairs of cross-sills arranged in spaced relation transversely of the furnace between the combustion chamber and the heating chamber, bolts for connecting each pair of spaced cross-sills together, a plurality of stationary guide-bars extending longitudinally of the furnace and mounted on the bolts between the pairs of transversely extending cross-sills for supporting one of the ends of the articles to be heat treated, longitudinally extending pusher-bars between the guide-bars in staggered relation therewith for supporting the opposite ends of the articles, and means for reciprocating the pusher-bars to advance the articles through the heating chamber of the furnace.

20. A furnace of the class described for heat treating headed bolt-blanks or the like, comprising a combustion chamber and a heating chamber, top and bottom cross-sills arranged in pairs in spaced relation to each other extending transversely of the furnace between the combustion chamber and the heating chamber, bolts for connecting the top and bottom cross-sills together, a plurality of stationary guide-bars extending longitudinally of the furnace and mounted on the bolts in spaced relation between the top and bottom cross-sills for supporting the headed ends of the blanks, longitudinally extending pusher-bars slidably engaging the bottom cross-sills and arranged in staggered relation between the guide-bars, sockets formed in the pusher-bars for supporting the shank ends of the blanks, and means for reciprocating the pusher-bars to advance the blanks in a step-by-step movement through the heating chamber of the furnace.

21. A furnace of the class described for heat treating bolts or the like having a heating chamber, stationary guide-bars in the heating chamber for engaging the heads of the bolts adapted to support the said bolts suspended in a vertically inclined position, and pusher-bars for supporting the opposite ends of the bolts, and means for reciprocating the pusher-bars for advancing the bolts through the furnace.

22. A furnace of the class described for heat treating bolts or the like, a pair of spaced stationary guide-bars for engaging the heads of a row of bolts adapted to hold said bolts suspended in a vertically inclined position, a pusher-bar below the pair of spaced stationary guide-bars for engaging and supporting the opposite ends of the row of bolts, a plurality of pairs of spaced cross-sills for supporting the stationary guide-bars and pusher-bar, and means for reciprocating the pusher-bar for advancing the bolts through the furnace.

23. A furnace of the class described for heat treating bolts or the like, comprising a plurality of pairs of spaced stationary guide-bars, each of said pairs of stationary guide-bars adapted to engage the heads of a row of bolts and support said bolts suspended in a vertically inclined position to allow the heat to circulate around the bolts, a pusher-bar below the space of each pair of stationary guide-bars for supporting the opposite ends of the bolts, and means intermittently actuated for reciprocating the pusher-bars for advancing the bolts through the furnace.

24. A furnace of the class described for heat treating bolts or the like, comprising a plurality of pairs of spaced stationary guide-bars each adapted to support the heads of rows of bolts suspended in a vertically inclined position, a pusher-bar below the space of each pair of stationary guide-bars having sockets formed therein for engaging the lower ends of each of the rows of bolts, a yoke secured to each pusher-bar and a cam adapted to intermittently engage each yoke for reciprocating the pusher-bars to advance the rows of bolts through the furnace.

25. A furnace of the class described for heat treating bolts or the like, comprising a plurality of pairs of spaced stationary guide-bars, each pair of said stationary guide-bars adapted to support the heads of a row of bolts vertically suspended to allow the heat to circulate around the bolts, a pusher-bar below the space of each pair of stationary guide-bars for engaging the lower ends of each of the rows of bolts, yokes each connected to one end of a plurality of said pusher-bars, means for adjusting the pusher-bars in relation to the yokes, and a cam for intermittently engaging each yoke for reciprocating the pusher-bars for advancing the rows of bolts through the furnace.

26. A furnace of the class described for heat treating bolts or the like, comprising a combustion chamber and a heating chamber, a plurality of pairs of spaced stationary guide-bars in the heating chamber for supporting one end of rows of bolts to be heat treated suspended in a vertically inclined position, movable pusher-bars each adapted to support the opposite ends of a row of bolts, a plurality of pairs of spaced cross-sills between the combustion heating chambers for supporting the stationary guide-bars and the pusher-bars, a plurality of yokes each adapted to connect a plurality of the pusher-bars together in sets, and a cam for intermittently engaging each yoke for reciprocating each set of pusher-bars in timed relation to each other.

27. A furnace of the class described for heat treating bolts or the like, comprising a combustion chamber substantially open at the top to communicate with a heating chamber, a plurality of pairs of spaced cross-sills, a plurality of pairs of spaced stationary guide-bars supported by the cross-sills in the heating chamber extending from the charging to the discharge end of the furnace, each of said spaced guide-bars adapted to support the head ends of a row of bolts to be heat treated suspended in a vertically inclined position, a pusher-bar below the space of each pair of stationary guide-bars, sockets formed in the pusher-bars for receiving the lower ends of the rows of bolts, a yoke adjustably secured to each pusher-bar, and a rotating cam adapted to intermittently engage each yoke in timed relation to each other for each forward and backward stroke of the pusher-bars.

JAMES A. KINNEY.